Patented Nov. 17, 1931

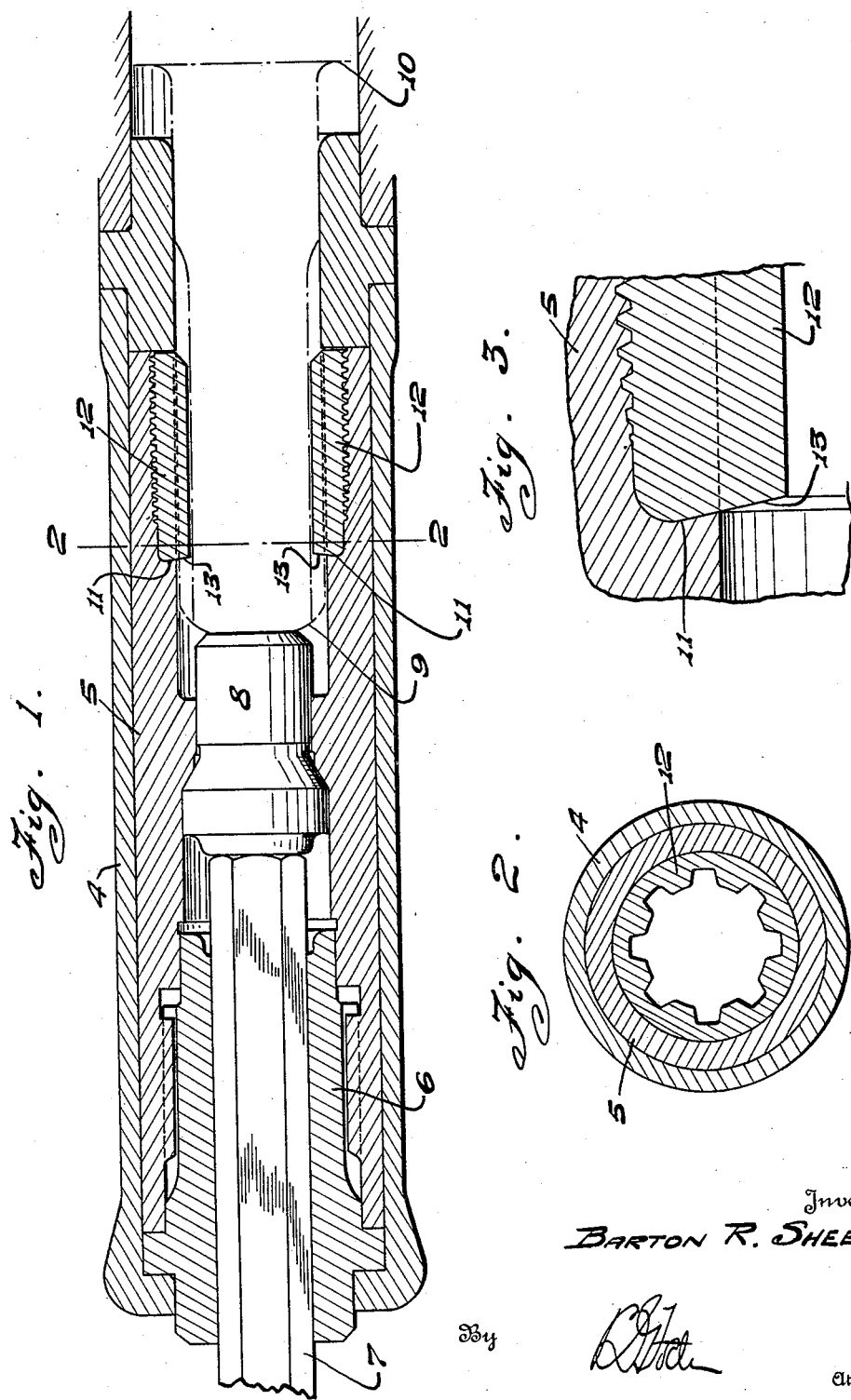

1,832,141

UNITED STATES PATENT OFFICE

BARTON R. SHEETS, OF DENVER, COLORADO, ASSIGNOR TO GARDNER-DENVER COMPANY, OF DENVER, COLORADO, A CORPORATION OF DELAWARE

TOOL HOLDING CHUCK

Application filed May 21, 1928. Serial No. 279,375.

In the construction of chucks for rock drills and similar tools in which the chuck is rotatable, the chuck driver or sleeve is ordinarily made of steel, and the nut that is engaged with the hammer piston and is carried by the sleeve, is of bronze. Heretofore the face of the shoulder in the sleeve against which the nut is abutted, has been in a plane perpendicular to the longitudinal axis of the sleeve. Experience has shown that there is a tendency of the nut to be moved against this shoulder, and as a result the material of the nut at its abutting end is caused to be pressed out against the reciprocating face of the piston hammer. This has a tendency to scar and retard the free movement of the hammer.

The object of the present invention is to provide a structure that will overcome this difficulty.

The preferred embodiment is illustrated in the accompanying drawings, wherein:

Figure 1 is a longitudinal sectional view through the chuck end of a rock drill.

Figure 2 is a cross sectional view on the line 2—2 of Figure 1.

Figure 3 is a detail view on an enlarged scale of the abutment shoulder and the end of the nut engaging the same.

The structure in its general make-up may be of the usual character. It includes a chuck housing 4, within which is a rotatable chuck driver in the form of a sleeve 5. Interlocked with the front end of the sleeve is the chuck 6 that receives the shank 7 of a drill steel or other tool. A tappet 8 is mounted in the chuck driver and is abutted against by the steel. This tappet is hammered upon by the extension 9 of a reciprocatory hammer piston 10.

Formed within the rear portion of the chuck driver or sleeve 5 is a rearwardly faced shoulder 11 that is inclined rearwardly and inwardly so that it is out of a plane perpendicular to the longitudinal axis of the sleeve 5. The nut 12 with which the hammer extension 9 slidably interfits is threaded into the rear end of the sleeve and its inner end is beveled—that is to say, its end face 13 is inclined inwardly and rearwardly to correspond to the inclination of the face 11 of the shoulder, the sleeve 5 being of steel and the nut 12 of softer material, such as bronze and the like. It has been found that with this formation, there is not the tendency of the metal, forming the inner end of the nut 12, to be crowded inwardly so as to scratch and mar the extension 9 of the hammer extension 10 and retard its free movement.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim is:

In a hammer tool, the combination with a rotatable tool holder including a sleeve having an internal rearwardly faced abutment shoulder that is inwardly and rearwardly inclined to a transverse plane perpendicular to the longitudinal axis of the sleeve, said sleeve being internally threaded in rear of the shoulder, a nut threaded into the sleeve and having its front end inclined correspondingly to and abutting the said shoulder, said nut being of softer material than the sleeve, and a hammer piston having a slidably interlocked interfitting engagement with the nut.

In testimony whereof, I affix my signature.

BARTON R. SHEETS.